US009363132B2

(12) United States Patent
Lyle et al.

(10) Patent No.: US 9,363,132 B2
(45) Date of Patent: Jun. 7, 2016

(54) MAXIMIZING THROUGHPUT OF STREAMING MEDIA BY SIMULTANEOUSLY CONNECTING TO STREAMING MEDIA SERVER OVER MULTIPLE INDEPENDENT NETWORK CONNECTIONS

(71) Applicant: International Business Machines Corporation, Armonk, NY (US)

(72) Inventors: Ruthie D. Lyle, Durham, NC (US); Dana L. Price, Cary, NC (US)

(73) Assignee: International Business Machines Corporation, Armonk, NY (US)

( * ) Notice: Subject to any disclaimer, the term of this patent is extended or adjusted under 35 U.S.C. 154(b) by 498 days.

(21) Appl. No.: 13/869,669

(22) Filed: Apr. 24, 2013

(65) Prior Publication Data
US 2014/0325022 A1     Oct. 30, 2014

(51) Int. Cl.
*G06F 15/16*     (2006.01)
*H04L 29/08*     (2006.01)
*H04L 29/06*     (2006.01)

(52) U.S. Cl.
CPC ...... *H04L 29/08027* (2013.01); *H04L 65/4084* (2013.01); *H04L 65/602* (2013.01); *H04L 65/607* (2013.01); *H04L 65/80* (2013.01)

(58) Field of Classification Search
None
See application file for complete search history.

(56) References Cited

U.S. PATENT DOCUMENTS

| | | | |
|---|---|---|---|
| 7,450,543 B2 | 11/2008 | Laroia et al. | |
| 2002/0133491 A1* | 9/2002 | Sim | G06F 17/30067 |
| 2003/0149792 A1* | 8/2003 | Goldstein | H04L 12/1836 709/246 |
| 2006/0195547 A1* | 8/2006 | Sundarrajan | H04L 69/163 709/217 |
| 2008/0022005 A1* | 1/2008 | Wu | H04L 65/80 709/231 |
| 2009/0019505 A1 | 1/2009 | Gopalakrishnan et al. | |
| 2009/0055471 A1* | 2/2009 | Kozat | H04L 65/4084 709/203 |
| 2009/0077233 A1* | 3/2009 | Kurebayashi | G06F 9/4843 709/224 |
| 2009/0141800 A1 | 6/2009 | Larson | |
| 2010/0284275 A1 | 11/2010 | Martinez et al. | |

(Continued)

FOREIGN PATENT DOCUMENTS

EP     1557024 B1     8/2007

OTHER PUBLICATIONS

Seenivasan, Thangam Vedagiri, "CStream: Neighborhood Bandwidth Aggregation for Better Video Streaming," http://web.cs.wpi.edu/~claypool/ms/cstream/cstream-thesis.pdf, May 2010.

(Continued)

*Primary Examiner* — Thomas Dailey
(74) *Attorney, Agent, or Firm* — Robert A. Voigt, Jr.; Winstead, P.C.

(57) ABSTRACT

A method, system and computer program product for maximizing throughout of streaming media. The client device simultaneously establishes multiple independent network connections with a server (e.g., streaming video server) to access various segments of a file (e.g., video file). The client device requests a different segment of the file to be downloaded from the server across each of these network connections based on the throughput of each network connection. The received segments of the file are buffered and combined to provide continuous uninterrupted access to the received segments of the file. In this manner, the user will be able to view the contents of the file without any interruptions or pauses while at the same time without requiring any coordination between the client device and the server and without any degradation in the quality of the viewed content of the file.

10 Claims, 5 Drawing Sheets

(56) References Cited

U.S. PATENT DOCUMENTS

| | | | |
|---|---|---|---|
| 2010/0287297 A1* | 11/2010 | Lefebvre | H04N 21/23805 709/231 |
| 2011/0083156 A1 | 4/2011 | Martinez et al. | |
| 2012/0226738 A1* | 9/2012 | Taneja | H04L 67/34 709/203 |
| 2012/0233345 A1* | 9/2012 | Hannuksela | H04N 21/26258 709/231 |

OTHER PUBLICATIONS

Office Action for U.S. Appl. No. 13/870,081 dated Sep. 21, 2015, pp. 1-13.

* cited by examiner

MAXIMIZING THROUGHPUT OF STREAMING MEDIA BY SIMULTANEOUSLY CONNECTING TO STREAMING MEDIA SERVER OVER MULTIPLE INDEPENDENT NETWORK CONNECTIONS

TECHNICAL FIELD

The present invention relates generally to streaming media, and more particularly to maximizing the throughput of streaming media (e.g., video stream) by simultaneously connecting to the streaming media server (e.g., streaming video server) over multiple independent network connections.

BACKGROUND

Currently, many companies, such as Hulu® and Netflix®, offer on-demand streaming video of television shows, movies, webisodes, trailers, clips and other types of media to a user at the user's computing device, commonly referred to as a "client device." The client device requests the video from a server, commonly referred to as a "streaming video server," which is transmitted to the client device in buffered increments over a network (also referred to as a "channel") using a transport protocol, such as User Datagram Protocol (UDP), Real Time Protocol (RTP), Transmission Control Protocol (TCP), Hypertext Transfer Protocol (HTTP), etc. For example, the streaming video server may transmit content to be buffered by the client device that corresponds to the initial 10 minutes of a movie. The media player on the user's client device will then load the content from the buffer to be played by the media player.

If, however, the user has a slow connection (bandwidth constrained) with the streaming video server, then the delivery of the audio and video information may be delayed, in which case the user may see a "loading screen" during the watching of the video as the amount of video viewed by the user has caught up to the amount of video downloaded to the client device. The user then has to wait (e.g., five minutes) for the media player to download more of the video content from the streaming video server to fill the buffer on the client device again with the next amount of video (e.g., next ten minutes) to be viewed by the user. Once the buffer is filled again, the media player will continue to play the next buffered segment of the video. These streaming video pauses during the watching of the video allowing the media player to download more of the video content from the streaming video server before resuming can negatively impact the experience of the user.

Currently, attempts have been made to reduce these streaming video pauses by having the streaming video server coordinate with the client device to have the video stream spread out across multiple network interfaces and then reassembled on the client side. However, such a solution requires coordination between the streaming video server and the client device.

Another attempt to reduce these streaming video pauses is by eliminating some of the data in the video stream that is deemed to not be essential in viewing the video content thereby reducing the amount of data that is downloaded by the client device from the streaming video server. However, the quality of the streaming video is greatly reduced.

As a result, the current means for reducing these streaming video pauses are subject to various limitations, such as requiring coordination between the streaming video server and the client device or resulting in the reduction in the quality of the streaming video.

BRIEF SUMMARY

In one embodiment of the present invention, a method for maximizing throughout of streaming media comprises establishing a first network connection with a server to access a first segment of a file. The method further comprises establishing a second network connection with the server to access a second segment of the file, where the first and second network connections are independent from one another and where the first network connection is established simultaneously as the second network connection. Furthermore, the method comprises receiving the first and second segments of the file from the server via the first and second network connections, respectively. Additionally, the method comprises buffering the first and second segments of the file received from the server. In addition, the method comprises combining, by a processor, the buffered first and second segments of the file to provide continuous uninterrupted access to the first and second segments of the file.

Other forms of the embodiment of the method described above are in a system and in a computer program product.

The foregoing has outlined rather generally the features and technical advantages of one or more embodiments of the present invention in order that the detailed description of the present invention that follows may be better understood. Additional features and advantages of the present invention will be described hereinafter which may form the subject of the claims of the present invention.

BRIEF DESCRIPTION OF THE SEVERAL VIEWS OF THE DRAWINGS

A better understanding of the present invention can be obtained when the following detailed description is considered in conjunction with the following drawings, in which.

DETAILED DESCRIPTION

The present invention comprises a method, system and computer program product for maximizing throughout of streaming media. In one embodiment of the present invention, the client device simultaneously establishes multiple independent network connections with a server (e.g., streaming video server) to access various segments of a file (e.g., video file). The client device requests a different segment of the file to be downloaded from the server across each of these network connections based on the throughput of each network connection. The received segments of the file are buffered and combined to provide continuous uninterrupted access to the received segments of the file. The client device may request an additional segment(s) of the file to be downloaded from the server over one or more of these established network connections if there are other segments of the file to be downloaded (i.e., the entirety of the file has not been downloaded from the server) upon completion of the buffering of a segment of the file received over that network connection with a size corresponding to the throughput of the network connection. In this manner, the client device buffers segments of the file prior to the user viewing those segments which will later be combined to ensure that the user will be able to view the contents of the file without any interruptions or pauses while at the same time without requiring any coordination between the client device and the server and without any degradation in the quality of the viewed content of the file.

While the following discusses the present invention in connection with maximizing the throughput of video stream data by simultaneously connecting to a streaming video server over multiple independent network connections, the principles of the present invention may be applied to other types of streaming media, including, but not limited to, audio (e.g., music), images (e.g., photographs), documents and text (e.g., real-time text). A person of ordinary skill in the art would be capable of applying the principles of the present invention to such implementations. Further, embodiments applying the principles of the present invention to such implementations would fall within the scope of the present invention.

In the following description, numerous specific details are set forth to provide a thorough understanding of the present invention. However, it will be apparent to those skilled in the art that the present invention may be practiced without such specific details. In other instances, well-known circuits have been shown in block diagram form in order not to obscure the present invention in unnecessary detail. For the most part, details considering timing considerations and the like have been omitted inasmuch as such details are not necessary to obtain a complete understanding of the present invention and are within the skills of persons of ordinary skill in the relevant art.

Figure 1:
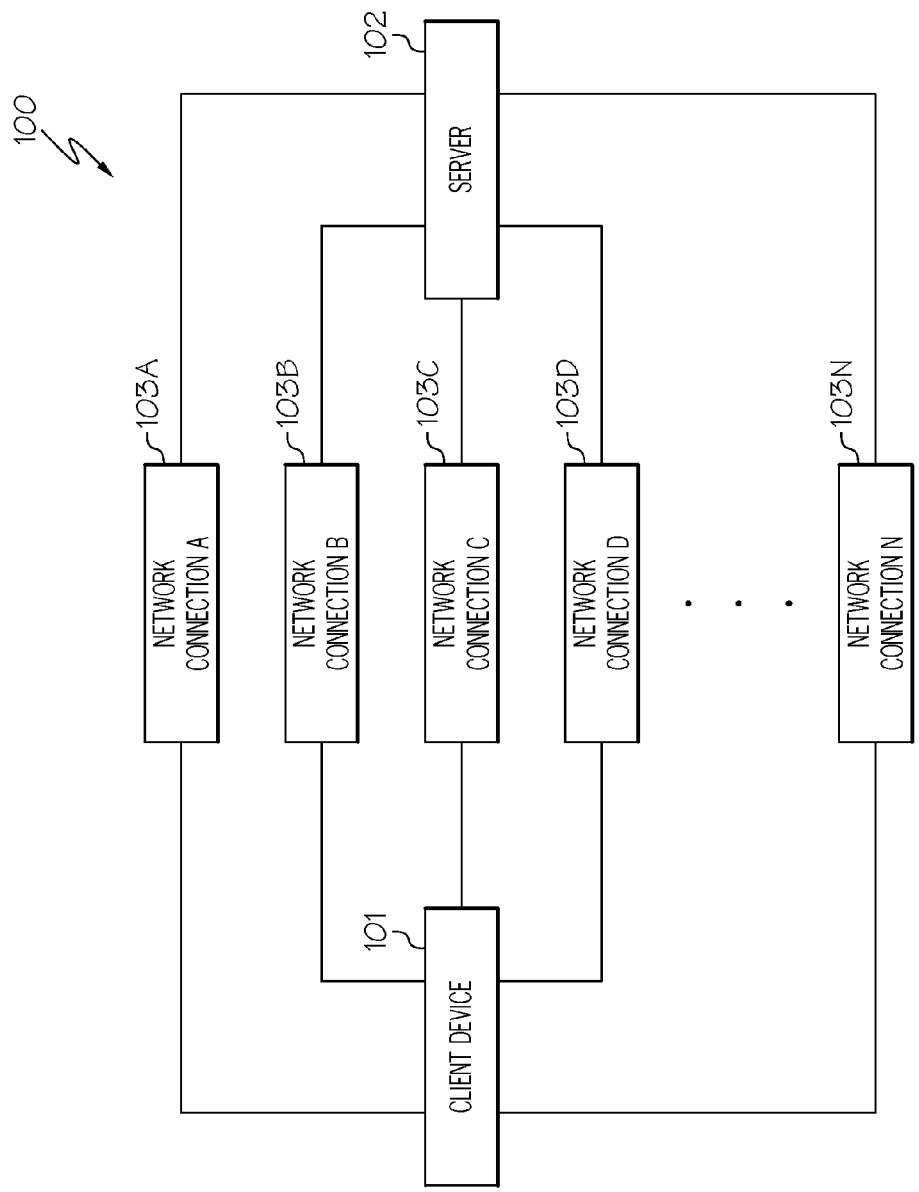
FIG. 1 illustrates a communication system configured in accordance with an embodiment of the present invention.

Referring now to the Figures in detail, FIG. 1 illustrates a communication system 100 for practicing the principles of the present invention in accordance with an embodiment of the present invention. Communication system 100 includes a client device 101 simultaneously connected to a server 102 (e.g., streaming video server) over multiple independent network connections 103A-103N, where N is a positive integer number. For example, client device 101 may be simultaneously connected to server 102 over network connections 103A, 103B and 103C. Network connections 103A-103N may collectively or individually be referred to as networks 103 or network 103, respectively. Network connections 103, as used herein, include both physical and logical connections providing connectivity between client device 101 and server 102. Client device 101 may be connected to server 102 over these independent network connections 103 via one or more networks. For example, client device 101 may be simultaneously connected to server 102 over network connections 103A, 103B and 103C via the same network or via different networks. Networks, as used herein, may be, for example, a local area network, a wide area network, a wireless wide area network, a circuit-switched telephone network, a Global System for Mobile Communications (GSM) network, a Wireless Application Protocol (WAP) network, a WiFi network, an IEEE 802.11 standards network, various combinations thereof, etc. Other networks, whose descriptions are omitted here for brevity, may also be used in conjunction with system 100 of FIG. 1 without departing from the scope of the present invention.

Client device 101 may be any type of computing device (e.g., portable computing unit, Personal Digital Assistant (PDA), smartphone, tablet computer, laptop computer, mobile phone, navigation device, game console, desktop computer system, workstation, Internet appliance and the like) configured with the capability of connecting to server 102 and consequently communicating with server 102 via network connection 103. For example, client device 101 is configured to stream media, including, but not limited to, video (e.g., movies, television shows, webisodes, trailers, clips), audio (e.g., music), images (e.g., photographs), documents and text (e.g., real-time text) from server 102 over network connections 103. In one embodiment, client device 101 is configured to establish multiple independent connections 103 with server 102 simultaneously thereby allowing client device 101 to request and receive different segments of a file (e.g., video file) from server 102 over these independent connections. These segments will be buffered and combined to provide continuous uninterrupted access to the file as discussed further below. A description of the hardware configuration of client device 101 is provided below in connection with FIG. 2.

Server 102 may be any type of server configured with the capability of streaming media, including, but not limited to, video (e.g., movies, television shows, webisodes, trailers, clips), audio (e.g., music), images (e.g., photographs), documents and text (e.g., real-time text). For example, server 102 may be a streaming video server with the capability of streaming video (e.g., movies) to client device 101.

Figure 2:
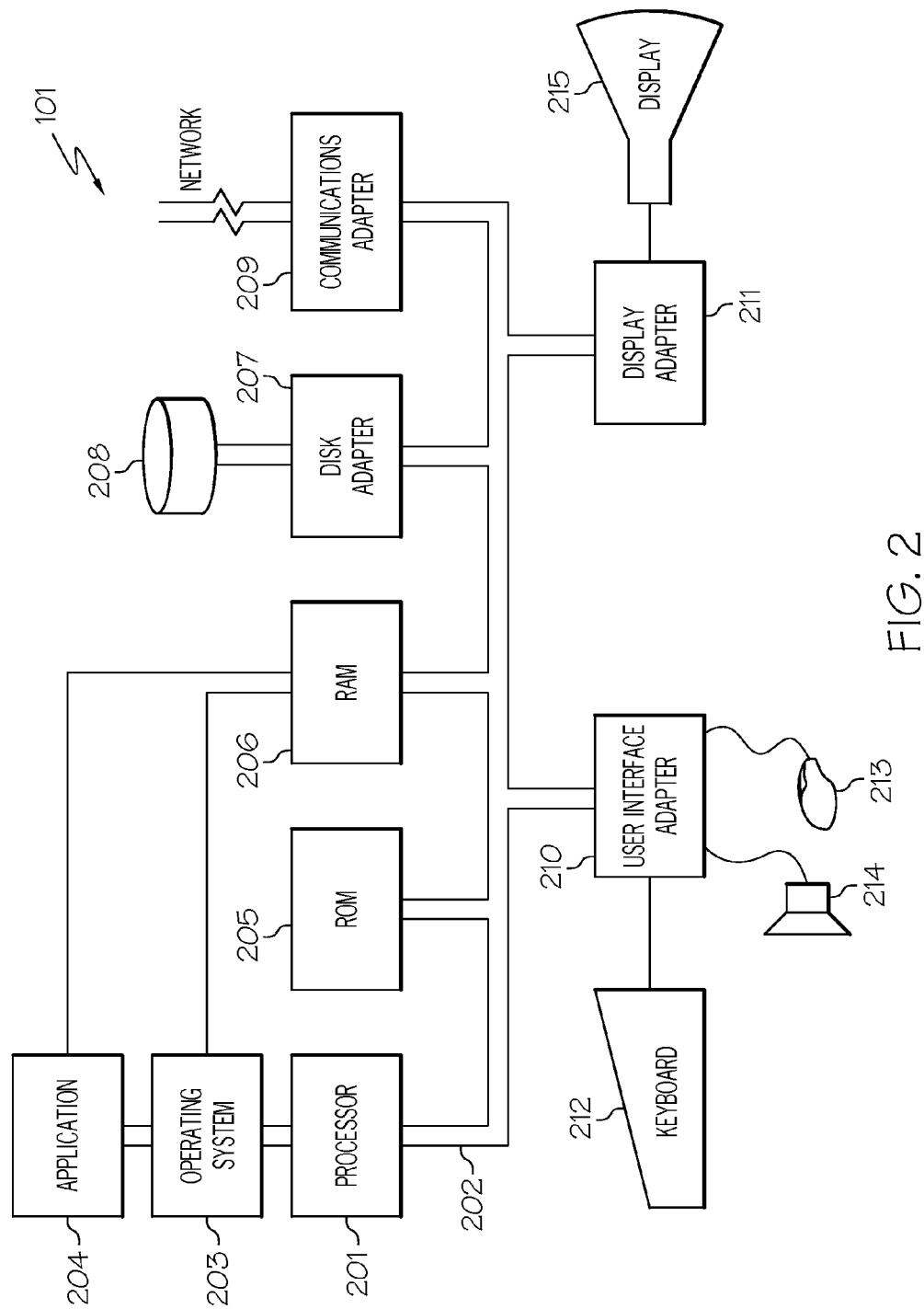
FIG. 2 illustrates a hardware configuration of a client device in accordance with an embodiment of the present invention.

Referring now to FIG. 2, FIG. 2 illustrates a hardware configuration of client device 101 (FIG. 1) which is representative of a hardware environment for practicing the present invention. Referring to FIG. 2, client device 101 has a processor 201 coupled to various other components by system bus 202. An operating system 203 runs on processor 201 and provides control and coordinates the functions of the various components of FIG. 2. An application 204 in accordance with the principles of the present invention runs in conjunction with operating system 203 and provides calls to operating system 203 where the calls implement the various functions or services to be performed by application 204. Application 204 may include, for example, a media player and a program for maximizing throughput of streaming media (e.g., video) by simultaneously connecting to a server 102 (FIG. 1) (e.g., streaming video server) over multiple independent network connections as discussed further below in association with FIGS. 3A-3B and 4.

Referring again to FIG. 2, read-only memory ("ROM") 205 is coupled to system bus 202 and includes a basic input/output system ("BIOS") that controls certain basic functions of client device 101. Random access memory ("RAM") 206 and disk adapter 207 are also coupled to system bus 202. It should be noted that software components including operating system 203 and application 204 may be loaded into RAM 206, which may be client device's 101 main memory for execution. Disk adapter 207 may be an integrated drive electronics ("IDE") adapter that communicates with a disk unit 208, e.g., disk drive. It is noted that the program for maximizing throughput of streaming media (e.g., video) by simultaneously connecting to a server 102 over multiple independent network connections, as discussed further below in association with FIGS. 3A-3B and 4, may reside in disk unit 208 or in application 204.

Client device 101 may further include a communications adapter 209 coupled to bus 202. Communications adapter 209 interconnects bus 202 with an outside network thereby enabling client device 101 to communicate with server 102.

I/O devices may also be connected to client device 101 via a user interface adapter 210 and a display adapter 211. Keyboard 212, mouse 213 and speaker 214 may all be interconnected to bus 202 through user interface adapter 210. A display monitor 215 may be connected to system bus 202 by display adapter 211. In this manner, a user is capable of inputting to client device 101 through keyboard 212 or mouse 213 and receiving output from client device 101 via display 215 or speaker 214.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or flash memory), a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the C programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the present invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the function/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the function/acts specified in the flowchart and/or block diagram block or blocks.

As stated in the Background section, currently, attempts have been made to reduce these streaming video pauses by having the streaming video server coordinate with the client device to have the video stream spread out across multiple network interfaces and then reassembled on the client side. However, such a solution requires coordination between the streaming video server and the client device. Another attempt to reduce these streaming video pauses is by eliminating some of the data in the video stream that is deemed to not be essential in viewing the video content thereby reducing the amount of data that is downloaded by the client device from the streaming video server. However, the quality of the streaming video is greatly reduced. As a result, the current means for reducing these streaming video pauses are subject to various limitations, such as requiring coordination between the streaming video server and the client device or resulting in the reduction in the quality of the streaming video.

Figure 3A:
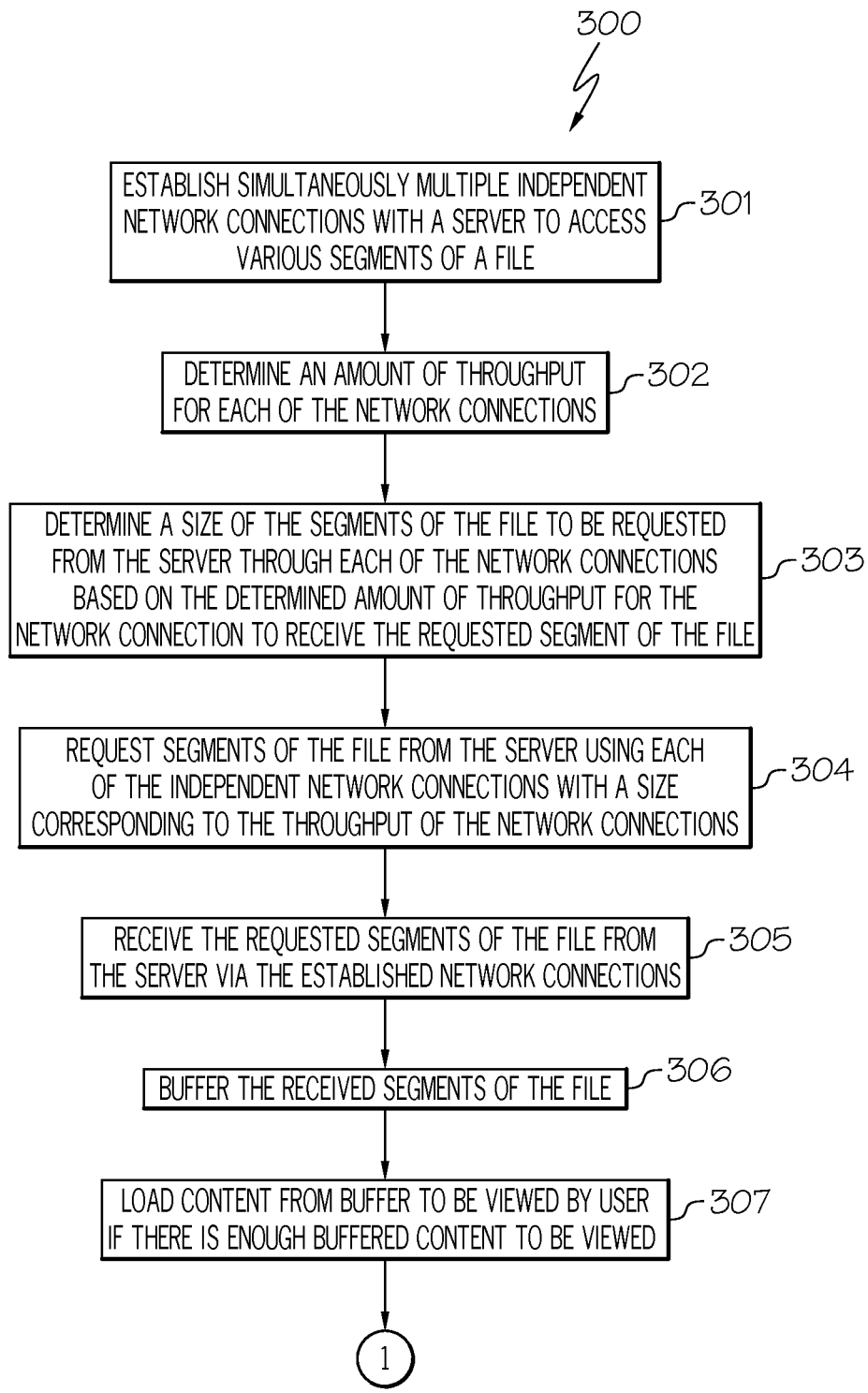
FIGS. 3A-3B are a flowchart of a method for maximizing throughput of streaming media by simultaneously connecting to a server over multiple independent network connections in accordance with an embodiment of the present invention.
Figure 3B:
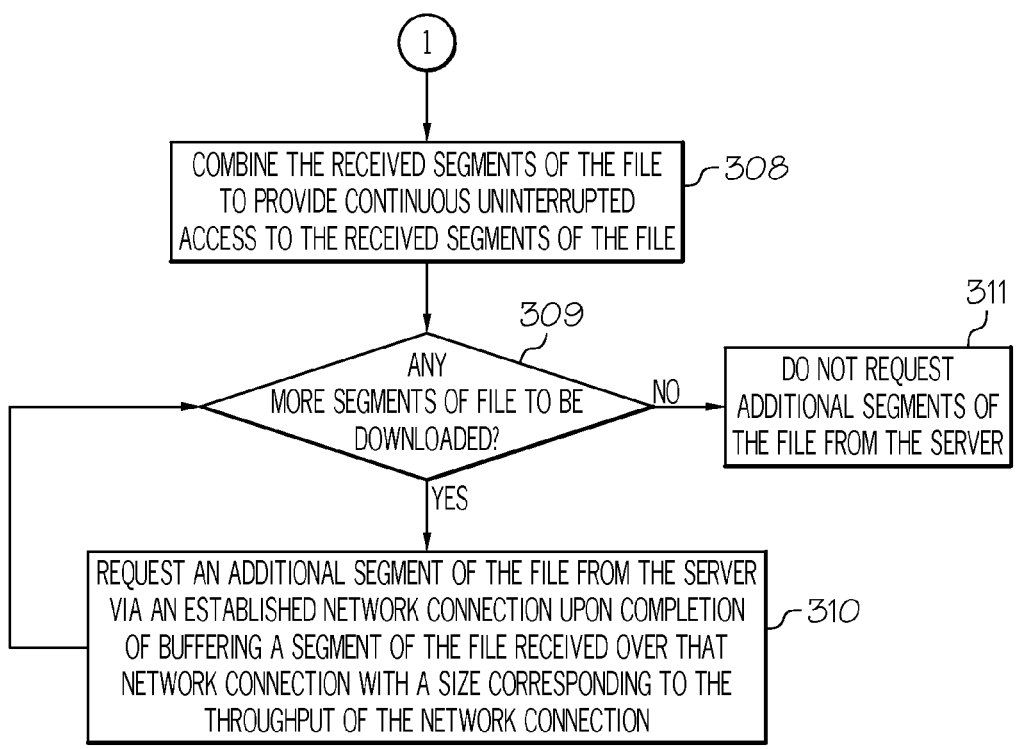
Figure 4:
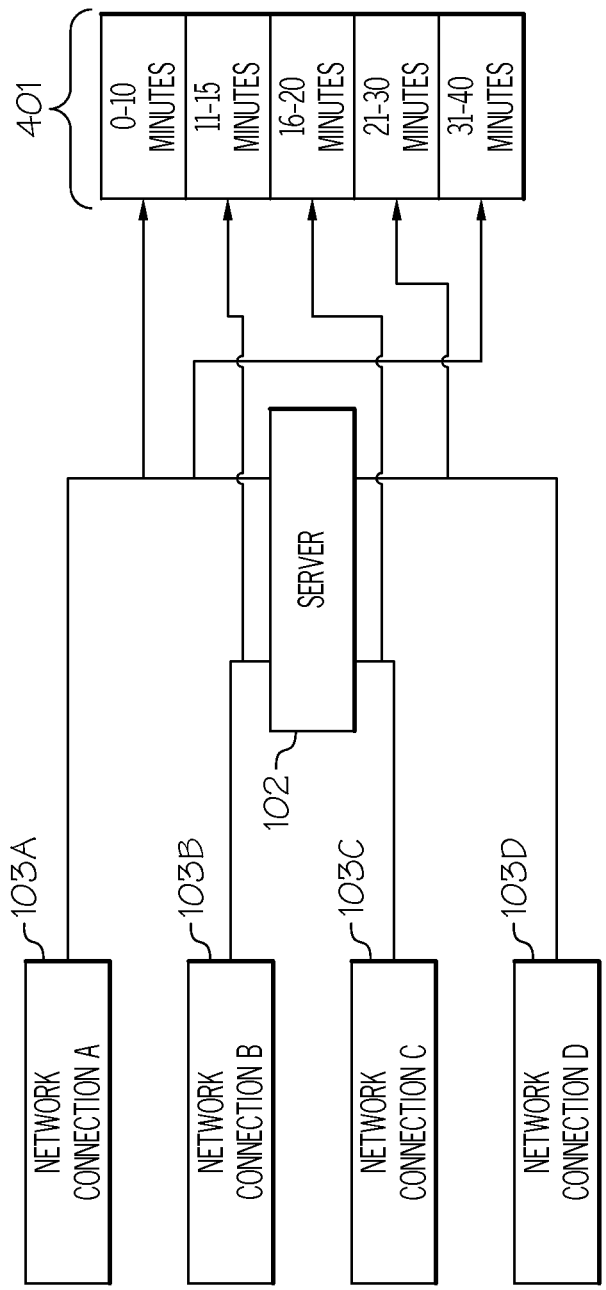
FIG. 4 illustrates the client device requesting various sizes of segments of a file across various network connections based on the throughput of the network connections in accordance with an embodiment of the present invention.

The principles of the present invention provide a means for reducing these streaming video pauses without requiring coordination between the streaming video server and the client device and without any reduction in the quality of the streaming video by simultaneously connecting to the streaming video server over multiple independent network connections as discussed below in connection with FIGS. 3A-3B and 4. FIGS. 3A-3B are a flowchart of a method for maximizing throughput of streaming media (e.g., video) by simultaneously connecting to server 102 (FIG. 1) over multiple independent network connections. FIG. 4 illustrates client device 101 (FIGS. 1 and 2) requesting various sizes of segments of a file across various network connections based on the throughput of the network connections.

As stated above, FIGS. 3A-3B are a flowchart of a method 300 for maximizing throughput of streaming media (e.g., video) by simultaneously connecting to a server 102 (FIG. 1) (e.g., streaming video server) over multiple independent network connections in accordance with an embodiment of the present invention.

Referring to FIG. 3A, in conjunction with FIGS. 1-2, in step 301, client device 101 establishes simultaneously multiple network connections 103 (e.g., network connections 103A, 103B, 103C, 103D) with server 102 (e.g., streaming video server) over one or more networks to access various segments of a file (e.g., video file). As discussed above, each network connection 103 is independent from one another. Furthermore, since each network connection 103 is independent from one another, server 102 will not be aware of client device 101 leveraging each of these network connections 103 to download the content of a file (e.g., video file) as discussed further below. In this manner, client device 101 can reduce interruptions or pauses in the viewing of the content of the file without requiring coordination between client device 101 and server 102 as discussed further below.

In step 302, client device 101 determines the amount of throughput for each of the network connections 103 established with server 102. In this manner, client device 101 will be able to determine the amount of data or the size of the segment of the file to be downloaded from server 102 via each network connection 103 as discussed below.

In step 303, client device 101 determines the size of the segment of a file (e.g., video file) to be requested from server 102 through each of the network connections 103 (network connections 103 established in step 301) based on the determined amount of throughput for the network connection 103 to receive the requested segment of the file. While the principles of the present invention discuss the present invention in connection with selecting the sizes of the segments of the file to be requested across various network connections 103 based on the throughput of network connections 103, the sizes of the segments of the file to be requested may be determined using other algorithms. The principles of the present invention are to cover any type of algorithm that would determine an appropriate amount of data to be streamed across network connection 103 taking into consideration the bandwidth constraints for that network connection 103.

In step 304, client device 101 requests various segments of the file from server 102 using each of the independent network connections 103 (network connections 103 established in step 301) with a size corresponding to the throughput of the network connections 103. An exemplary illustration of client device 101 requesting various sizes of segments of a file across various network connections 103 based on the throughput of the network connections 103 is provided below in connection with FIG. 4.

Referring to FIG. 4, FIG. 4 illustrates client device 101 requesting various sizes of segments of a file across various network connections 103 in accordance with an embodiment of the present invention. As illustrated in FIG. 4, if client device 101 simultaneously established multiple network connections 103 (e.g., network connections 103A, 103B, 103C and 104D) with server 102, and if the throughput of network connection 103A is deemed to have "good" throughput, then client device 101 may determine to request the first ten minutes (minutes 0 to 10) of a file (e.g., movie) from server 102 to be received via network connection 103A. If network connection 103B is deemed to have "fair" throughput, then client device 101 may determine to only request about five minutes of the file over such a network connection, such as the next five minutes (minutes 11 to 15) of the same file (e.g., movie) from server 102 to be received via network connection 103B. Similarly, if network connection 103C is deemed to have "fair" throughput, then client device 101 may determine to only request about five minutes of the file over such a network connection, such as the following five minutes (minutes 16 to 20) of the same file (e.g., movie) from server 102 to be received via network connection 103C. If network connection 103D is deemed to have "good" throughput, then client device 101 may determine to request about ten minutes of the file over such a network connection, such as the following ten minutes (minutes 21 to 30) of the same file (e.g., movie) from server 102 to be received via network connection 103D. As will be discussed further below, these requested segments of the file will be buffered in a buffer 401. In one embodiment, buffer 401 is implemented in software. In another embodiment, buffer 401 is implemented in a fixed memory location in hardware. In one embodiment, buffer 401 corresponds to a region of physical memory storage, such as memory 206 (FIG. 2).

Returning to FIG. 3A, in conjunction with FIGS. 1-2 and 4, in step 305, client device 101 receives the requested segments of the file from server 102 via the established network connections 103. That is, client device 101 commences with receiving the requested segments of the file from server 102 via the established network connections 103.

In step 306, client device 101 buffers the received segments of the file in buffer 401.

In step 307, client device 101, such as a media player of client device 101, loads the content from buffer 401 to be viewed by the user of client device 101 if there is enough buffered content to be viewed by the user.

Referring to FIG. 3B, in conjunction with FIGS. 1-2 and 4, in step 308, client device 101 combines the received segments of the file to provide continuous uninterrupted access to the received segments of the file. For example, referring to the example of FIG. 4, the segment corresponding to minutes 0 to 10 is combined with the segments corresponding to minutes 11 to 15, minutes 16-20 and minutes 21-30. In this manner, the user of client device 101 will be able to view minutes 0 to 30 continuously without any interruptions without requiring any coordination between client device 101 and server 102 and without any degradation in the quality of the viewed content of the file. Furthermore, user will be able to view the remaining portions of the file (e.g., movie) without any interruptions as discussed below.

In step 309, a determination is made by client device 101 as to whether there are any more segments of the file to be downloaded from server 102. That is, in step 309, a determination is made by client device 101 as to whether the entirety of the file (e.g., movie) has been downloaded from server 102.

If there are other segments of the file to be downloaded (i.e., the entirety of the file has not been downloaded from server 102), then, in step 310, client device 101 requests an additional segment of the file from server 102 via an established network connection 103 (network connection 103 established in step 301 of FIG. 3A) upon completion of buffering a segment of the file received over that network connection 103 with a size corresponding to the throughput of the network connection 103. For example, referring to FIG. 4, upon completion of buffering the segment of the file (e.g., movie) corresponding to minutes 0 to 10 of the file using network connection 103A, client device 101 may request an additional segment of the file, such as minutes 31-40 over that network connection 103A based on the throughput for that network connection 103A (e.g., network connection 103A is rated "good" and hence ten minutes of the file may be downloaded from server 102). The additional segment of the file will be buffered in buffer 401 and combined with the other segments as discussed above. Since client device 101 has simultaneously established multiple independent network connections 103 with server 102 and has buffered various segments of the file over these network connections 103 into buffer 401, by the time the user has viewed the $30^{th}$ minute of the file, the segment of the file corresponding to the $31^{st}$ to $40^{th}$ minute has already been buffered and ready to be viewed by the user, such as via a media player of client device 101.

Upon requesting an additional segment of the file from server 102, client device 101 determines whether there are additional segments of the file to be downloaded from server 102 in step 309. If there are additional segments of the file to be downloaded, then, as discussed above in connection with step 310, client device 101 downloads the next segment of the file over an established network connection 103 (e.g., network connection 103B) based on the throughput for that network connection 103 upon completion of buffering a segment of the file using that network connection 103. In this manner, client device 101 can continuously buffer segments of the file prior to viewing those segments which will later be combined with the previously downloaded segments thereby ensuring that the user of client device 101 will be able to view the contents of the file without any interruptions or pauses. Furthermore, in this manner, the user of client device 101 will be able to continuously view the content of the file without any interruptions or pauses while at the same time without requiring any coordination between client device 101 and server 102 and without any degradation in the quality of the viewed content of the file.

It is noted for clarity that client device 101 may download the next segment of the file over any of the established network connections 103 (not necessarily in the same order as downloading the previously downloaded segments of the file) upon the completion of buffering a segment of the file using that network connection 103. For example, if client device 101 downloads segment #1 across network connection 103A followed by downloading segment #2 across network connection 103B followed by downloading segment #3 across network connection 103C followed by downloading segment #4 across network connection 103D, client device 101 does not necessarily have to download the next segment across network connection 103A but can download the next segment across any of the previously established network connections 103 (network connections 103A, 103B, 103C, 103D). For example, the throughput of network connection 103A may have worsened and/or the throughput of the other network connections 103 may have improved thereby making it desirable to download the next segment across a different network connection 103. It is further noted that the principles of the present invention cover embodiments where client device 101 continues to dynamically assess the throughput of each of the established network connections 103 and requests the appropriate size of the next segment(s) of the file from the appropriate network connection(s) 103.

Returning to step 309, if, however, there are no more segments of the file to be downloaded from server 102 (i.e., the entirety of the file has been downloaded from server 102), then, in step 311, client device 101 does not request additional segments of the file to be downloaded from server 102.

In some implementations, method 300 may include other and/or additional steps that, for clarity, are not depicted. Further, in some implementations, method 300 may be executed in a different order presented and that the order presented in the discussion of FIGS. 3A-3B is illustrative. Additionally, in some implementations, certain steps in method 300 may be executed in a substantially simultaneous manner or may be omitted.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

The invention claimed is:

1. A computer program product embodied in a non-transitory computer readable storage medium for maximizing throughout of streaming media, the computer program product comprising the programming instructions for:
   establishing a first network connection with a server to access a first segment of a file;
   establishing a second network connection with said server to access a second segment of said file, wherein said first and second network connections are independent from one another, wherein said first network connection is established simultaneously as said second network connection;
   determining an amount of throughput for each of said first and second network connections;
   establishing one of a plurality of ratings for each of said first and second network connections based on said determined throughput, wherein each of said plurality of ratings is associated with requesting a different range of time of said file;
   requesting said first segment of said file corresponding to a first range of time of said file based on a rating of said first network connection;
   requesting said second segment of said file corresponding to a second range of time of said file based on a rating of said second network connection, wherein said second range of time is subsequent to said first range of time;
   receiving said first and second segments of said file from said server via said first and second network connections, respectively;
   buffering said first and second segments of said file received from said server; and
   combining said buffered first and second segments of said file to provide continuous uninterrupted access to said first and second segments of said file.

2. The computer program product as recited in claim 1, wherein said file comprises one of the following: a video file, an audio file, a document, an image and text.

3. The computer program product as recited in claim 1 further comprising the programming instructions for:
   requesting an additional segment of said file from said server via said first network connection for a third range of time of said file upon completion of buffering said first segment of said file in response to an entirety of said file not being downloaded from said server.

4. A system, comprising:
   a memory unit for storing a computer program for maximizing throughout of streaming media; and a processor coupled to said memory unit, wherein said processor, responsive to said computer program, comprises:
  circuitry for establishing a first network connection with a server to access a first segment of a file;
  circuitry for establishing a second network connection with said server to access a second segment of said file, wherein said first and second network connections are independent from one another, wherein said first network connection is established simultaneously as said second network connection;
  circuitry for determining an amount of throughput for each of said first and second network connections;
  circuitry for establishing one of a plurality of ratings for each of said first and second network connections based on said determined throughput, wherein each of said plurality of ratings is associated with requesting a different range of time of said file;
  circuitry for requesting said first segment of said file corresponding to a first range of time of said file based on a rating of said first network connection;
  circuitry for requesting said second segment of said file corresponding to a second range of time of said file based on a rating of said second network connection, wherein said second range of time is subsequent to said first range of time;
  circuitry for receiving said first and second segments of said file from said server via said first and second network connections, respectively;
  circuitry for buffering said first and second segments of said file received from said server; and
  circuitry for combining said buffered first and second segments of said file to provide continuous uninterrupted access to said first and second segments of said file.

5. The system as recited in claim 4, wherein said file comprises one of the following: a video file, an audio file, a document, an image and text.

6. The system as recited in claim 4, wherein said processor further comprises:
  circuitry for requesting an additional segment of said file from said server via said first network connection for a third range of time of said file upon completion of buffering said first segment of said file in response to an entirety of said file not being downloaded from said server.

7. The system as recited in claim 4, wherein said system is a mobile device.

8. The system as recited in claim 7, wherein said mobile device comprises one of the following: a smartphone, a tablet computer and a laptop computer.

9. The computer program product as recited in claim 1, wherein said first network connection is established with said server to access said first segment of said file via a first network, wherein said second network connection is established with said server to access said second segment of said file via a second network, wherein said first and second networks are separate and independent networks.

10. The system as recited in claim 4, wherein said first network connection is established with said server to access said first segment of said file via a first network, wherein said second network connection is established with said server to access said second segment of said file via a second network, wherein said first and second networks are separate and independent networks.

* * * * *